United States Patent
Wendel et al.

(10) Patent No.: US 10,126,809 B2
(45) Date of Patent: Nov. 13, 2018

(54) ELECTRONIC DEVICE WITH DEMONSTRATION MODE

(71) Applicant: FREESCALE SEMICONDUCTOR, INC., Austin, TX (US)

(72) Inventors: Dirk Wendel, Grasbrunn (DE); Carl Culshaw, Wigan (GB); Michael A. Staudenmaier, Munich (DE)

(73) Assignee: NXP USA, Inc., Austin, TX (US)

( * ) Notice: Subject to any disclaimer, the term of this patent is extended or adjusted under 35 U.S.C. 154(b) by 218 days.

(21) Appl. No.: 14/788,401

(22) Filed: Jun. 30, 2015

(65) Prior Publication Data
US 2017/0003732 A1 Jan. 5, 2017

(51) Int. Cl.
*G06F 1/00* (2006.01)
*G06F 1/32* (2006.01)
*G05F 1/66* (2006.01)

(52) U.S. Cl.
CPC .............. *G06F 1/3287* (2013.01); *G05F 1/66* (2013.01); *G06F 1/324* (2013.01); *G06F 1/3212* (2013.01)

(58) Field of Classification Search
CPC ................................. G06F 1/3287; G05F 1/66
USPC ........................................................ 713/324
See application file for complete search history.

(56) References Cited

U.S. PATENT DOCUMENTS

| | | | | |
|---|---|---|---|---|
| 5,499,019 A | * | 3/1996 | Burgan | G08B 5/229 340/4.31 |
| 5,606,624 A | * | 2/1997 | Damato | H04R 27/00 340/4.42 |
| 7,795,842 B2 | | 9/2010 | Sherman et al. | |
| 8,369,904 B2 | | 2/2013 | Bennis et al. | |
| 2004/0132501 A1 | | 7/2004 | Jiang | |
| 2014/0031090 A1 | * | 1/2014 | Hart | H04W 52/0277 455/572 |

FOREIGN PATENT DOCUMENTS

| CN | 200976606 Y | 11/2007 |
|---|---|---|
| CN | 2011226343 Y | 9/2008 |

OTHER PUBLICATIONS

U.S. Appl. No. 14/707,179, filed May 8, 2015, entitled "Charge Pump Apparatus, Phase-Locked Loop, and Method of Operating a Charge Pump Apparatus".

* cited by examiner

*Primary Examiner* — Austin Hicks

(57) ABSTRACT

An electronic device includes a plurality of modules coupled to a charge storage node. A method for operating the electronic device includes starting up the electronic device and entering a demonstration mode. During the demonstration mode, a demonstration is performed for a predetermined amount of time by enabling a subset of the plurality of modules. At the expiration of the predetermined amount of time, the electronic device is shut down. If the electronic device is operating in normal operating mode, the charge level of the charge storage cell can be monitored such that when it falls below a minimum charge threshold, the electronic device is shut down. The minimum charge threshold can be based on a number of demonstrations to be performed on a remaining capacity of the charge storage cell.

17 Claims, 3 Drawing Sheets

ELECTRONIC DEVICE WITH DEMONSTRATION MODE

BACKGROUND

Field

This disclosure relates generally to electronic devices, and more specifically, to electronic devices with a demonstration mode.

Related Art

According to security measures in many travel stations, such as airports, train stations, bus stations, shipping ports, or other stations around the world, passengers more and more need to demonstrate that electronic devices taken aboard the vehicle or craft can be activated prior to boarding. If a device is inoperable, in many instances, the passenger is barred from taking it aboard the vehicle or craft. This typically applies to any type of electronic device, such as, but not limited to, laptops, cell phones, cameras, tablets, and personal digital assistants (PDAs). The most common source for inoperability is an empty battery, which prevents demonstrating that the electronic device is operable. Furthermore, suitable chargers provided at security check points, such as at airport security checkpoints, may not be compatible with a particular electronic device or may take an unacceptable time to perform the charging. Therefore, a need exists for a demonstration mode which allows the demonstration of operability when needed.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In order to prevent the inability to demonstrate operability of an electronic device due to an empty battery, a demonstration mode is provided which has the ability to show a general working of a device. The demonstration consumes considerably lower power by only enabling a reduced set of modules, features, or functionality, or combinations thereof. The battery capacity (state of charge) of an electronic device is monitored to ensure that a sufficient level of battery charge remains to allow the electronic device to start in the demonstration mode at least n times for x seconds, in which the values of n, x, or both, can be programmed or selected for the electronic device by the customer or vendor. A user of the electronic device may specifically start up the device in the demonstration mode in which a demonstration is provided for a predetermined amount of time. If an electronic device is not started in the demonstration mode, the battery charge can be monitored so as to ensure that the battery charge is greater than a threshold, in which the threshold allows for sufficient demonstrations in accordance with the values of n and x. When, upon startup, the battery charge is below this threshold, the electronic device operates only in the demonstration mode. During normal operation, outside of demonstration mode, the battery charge can be monitored such that if it falls below the threshold, the electronic device is shutdown so as to ensure sufficient charge remains for demonstrations.

Figure 1:
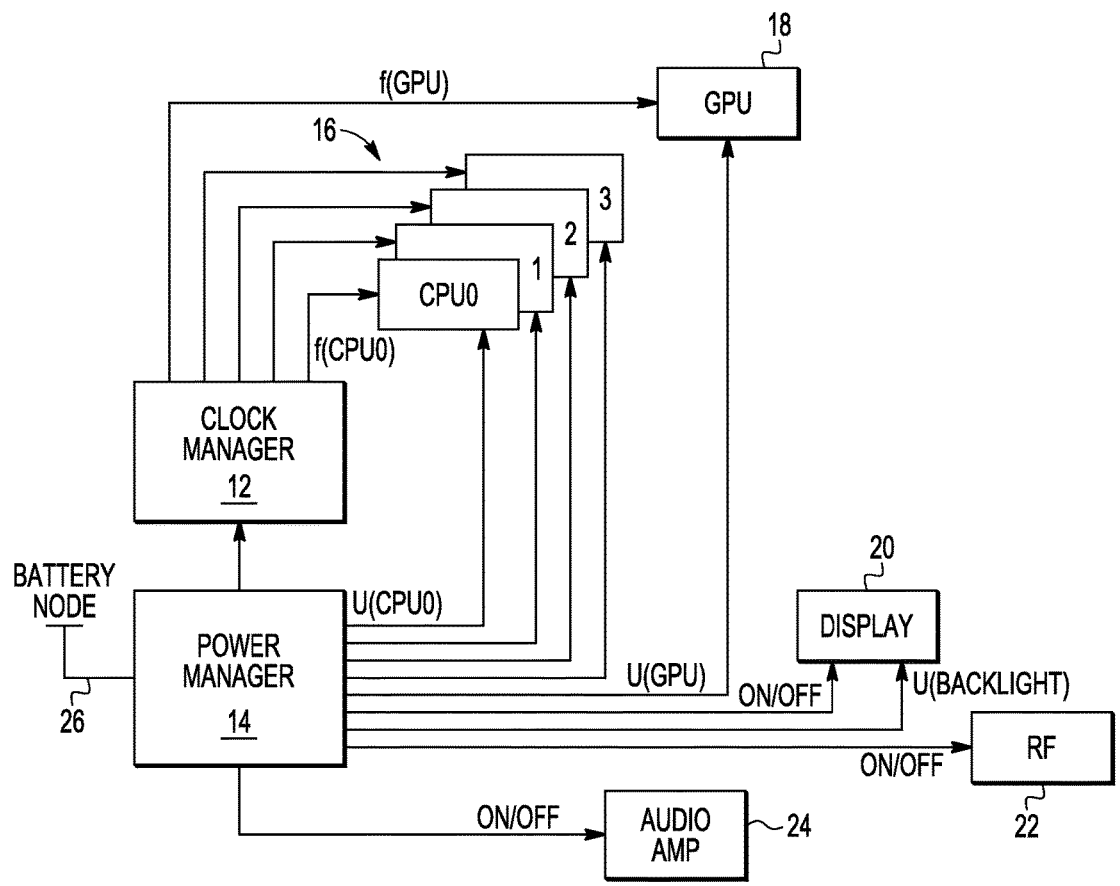
FIG. 1 illustrates, in block diagram form, an electronic device in accordance with one embodiment of the present invention.

FIG. 1 illustrates, in block diagram form, an electronic device 10 in accordance with one embodiment of the present invention. Electronic device 10 may be any type of electronic device, such as a laptop, cell phone, camera, tablet, personal digital assistant (PDA), or the like, and has a normal operating mode and a demonstration mode. Device 10 includes a clock manager 12, a power manager 14, a set of processing circuits 16, a graphics processing unit (GPU) 18, a display 20, a radio frequency (RF) unit 22, and an audio amplifier (audio amp) 24. In the illustrated embodiment, the set of processing circuits 16 includes 4 CPUs (CPU0-CPU3). However, the set may include any number of CPUs and, in addition to CPUs or instead of CPUs, may include other types of processing circuits, such as, for example, one or more Application Specific Integrated Circuits (ASICs). RF unit 22 may include an RF receiver, transmitter, or both. Clock manager 12 is coupled to each CPU in set of CPUs 16 and to GPU 18. Power manager 14 is coupled to clock manager 12 and is coupled to each CPU in set of CPUs 16, GPU 18, display 20, RF 22, and audio amp 24. Power manager 14 is also coupled to a battery node which receives the supply voltage from a battery coupled to device 10. Note that device 10 may include any number of modules in addition to or in place of set of CPUs 16, GPU 18, display 20, RF 22, and audio amp 24. Each module in device 10 may be coupled, as needed, to clock manager 12, power manager 14, or both. Note that all the modules illustrated in FIG. 1 may be included on a single integrated circuit, or may be included on multiple integrated circuits, such as within a System on a Chip (SoC). For example, GPU 18 may be located on a separate integrated circuit from the other modules.

Clock manager 12 provides clocking signals to the CPUs (e.g. provides f(CPU0) to CPU0, f(CPU1) to CPU1, etc.) and to GPU 18 (e.g. provides f(GPU) to GPU 18). These clocking signals may be a clock signal operating at the desired frequency for the corresponding module, a signal indicating the desired frequency of the clock for the corresponding module, or a signal which can switch the clock of the corresponding module on or off. Power manager 14 provides power signals to the CPUs (e.g. provides U(CPU0) to CPU0, U(CPU1) to CPU1, etc.), to GPU 18 (e.g. U(GPU), and to display 20 (e.g. U(backlight) to display 20 which may control the voltage supplied to the backlight operation of display 20). These power signals can provide the power supply terminal itself to the corresponding module or may be a signal which switches the voltage for the corresponding module. Power manger 14 may also provide on/off indicators to display 20, RF unit 22, and audio amp 24.

During operation in the normal operating mode, outside of demonstration mode, clock manger 12 and power manger 14 manage the provision of clocks and power to each of set of CPUs 16, GPU 18, display 20, RF 22, and audio amp 24. Each module is powered up as needed to perform its desired normal operating function. As will be described in more detail below, power manager 14 also monitors the remaining capacity of a battery coupled to battery node 26 to ensure that sufficient capacity remains for a particular number of startups in demonstration mode. In one embodiment, once the capacity drops below a threshold which would no longer allow for a desired number of startups in demonstration mode, power manager 14 communicates such information with clock manager 12 and to the operating system or application running on the electronic device so that device 10 can be properly shut down.

In demonstration mode, a processing circuit (which may be any processing circuit within set 16) instructs power manger 14 and clock manager 12 to power up and clock one or more modules of the device, such as a processing circuit within set 16, GPU 18, display 20, RF unit 22, or audio amp 24, or combinations thereof, to perform the desired demonstration of functionality. However, the enabled modules are powered down as soon as possible after the desired functionality has been demonstrated or after a predetermined amount of time. For example, in demonstration mode, only a particular section or module is enabled (e.g. powered, clocked, or both). In an electronic camera, this may correspond to powering up a smaller display of the camera for a predetermined amount of time. Also, when the smaller display is powered up, it can be provided with a lower backlight power supply (e.g. by controlling U(backlight) provided to display 20 in the example of FIG. 1) which results in a darker image with less power consumption, but still sufficient to demonstrate appropriate functionality. During demonstration mode of the camera, other modules which consume more power are left off or disabled, such as, for example, the camera sensor used for capturing images, the image processor itself, and the storage circuitry for storing images. Alternatively, in demonstration mode, any combination of modules may be enabled to demonstration functionality of the device but with reduced power consumption. In one example, all modules may be enabled but at a reduced clock speed in order to reduce power consumption.

In demonstration mode, the same modules or portions of modules which operate during normal mode are used during demonstration mode. This prevents the need for adding additional modules which simply imitate a function of the electronic device. For example, in the case that device 100 is a camera, the aperture opening can be periodically opened and closed while the camera lens is held in position. In another example, a low power cycling approach could be to use the built in speaker to sound a tone sequence or a particular word or phrase. In another example, an LED indicator of the electronic device can be enabled to flash. In yet another example, a random number generator (RNG) module of the electronic device can be enabled to perform a function during demonstration mode. In this example, the security system at the security station which performs the security test can also have a built-in RNG decoder, possibly referring to some database, in which the database may be domestic or international. Combining the RNG and seed of the electronic device with such a database could allow another level of protection and testing to be carried out. In this manner, not only is a portion of the electronic device momentarily powered during demonstration mode, but a challenge/response can be communicated between the security station and the electronic device during the demonstration mode.

In one embodiment, demonstration mode is activated by a predetermined activation sequence or other switch-on procedure. The predetermined activation sequence may include any type of user inputs, such as a predetermined key sequence (which may include a series of one or more special keys), a predetermined sequence of one or more buttons imitated on a touch screen, a sequence of one or more gestures on a touch screen or in front of a camera, one or more audio commands, or the like. Furthermore, the predetermined activation sequence may be a wireless activation sequence. Alternatively, the demonstration mode can be activated automatically upon switch-on (at start up) with a subsequent switch-off without further booting of the device. For example, the demonstration mode is entered upon start up and the electronic device can then revert to normal operating mode after determining that there is sufficient battery capacity for the desired number of demonstrations.

Figure 2:
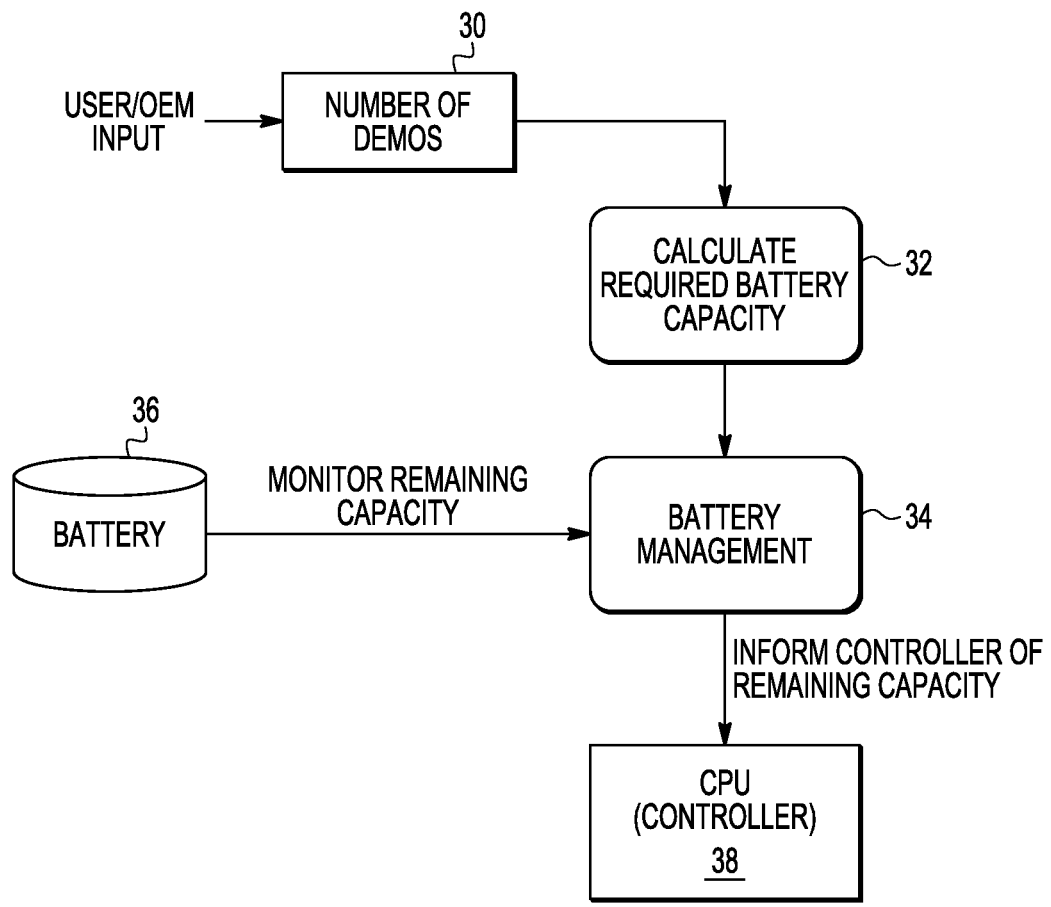
FIG. 2 illustrates, in block diagram form, a portion of the electronic device of FIG. 1, in accordance with one embodiment of the present invention.

FIG. 2 illustrates, in partial block diagram form and data flow form, a portion of electronic device 10. As discussed above, a user or manufacturer of the device can input a number of demos ("n") which is to be guaranteed by the electronic device. This value may be stored within storage circuitry 30. A module 32 is configured to use the value "n" to calculate a required battery capacity in order to ensure that electronic device 10 is capable of starting up in demonstration mode at least "n" times. This minimum battery capacity which allows for at least "n" more demonstrations may be referred to as the minimum battery threshold. In one embodiment, each demonstration (i.e. each time electronic device is started in demonstration mode) lasts a predetermined amount of time, such as for "x" seconds. The value for "x" may be set by the manufacturer of the device such that only the value of "n" is provided by the user or manufacturer for determining the minimum battery capacity. Alternatively, the value for "x" may also be provided by the user or manufacturer to allow for improved flexibility in setting up the demonstration mode. Note that the values of "n" and "x" can be any value greater than zero. In one embodiment, a value of zero for "n" or "x" or both can be used to switch-off or disable this monitoring feature of the battery capacity. Storage circuitry 30 and module 32 may be located within power manager 14, or may be located elsewhere within device 10.

Still referring to FIG. 2, during operation of electronic device 10, a battery 36 is coupled to device 10 (such as to battery node 26 in FIG. 1). A battery management unit 34, which may be located within power manager 14 or elsewhere within device 10, is configured to monitor the remaining capacity of a battery coupled to battery node 26, such as battery 36 of FIG. 2. Battery management unit 34 is coupled to a CPU 38 of device 10 (in which CPU 38 can be any CPU within set 16). Battery management unit 34 is configured to inform CPU 38 when the remaining capacity of battery 36 is below the minimum battery threshold determined by module 32. In response to the remaining battery capacity being less than the minimum battery threshold, CPU 38 may instruct clock manager 12 and power manager 14 to perform different types of operations. For example, if the battery level falls below the minimum battery threshold during normal operation, CPU 38 may instruct an immediate shutdown of device 10 to ensure that the device can still be started up in a demonstration mode. Upon startup of electronic device 10, if the battery level is below the minimum battery threshold, CPU 38 may immediately enter demonstration mode and thus not enter normal operating mode.

Note that in alternate embodiments, any processing circuit within set 16, or another module within device 10 outside of set 16, can be coupled to battery management unit 34 to receive notification of when the remaining battery capacity falls below the minimum battery threshold and control modules of device 10 accordingly. Also, in an alternate embodiment, the minimum battery threshold may be a fixed value provided by the user or the manufacturer of the device rather than being determined by module 32.

Figure 3:
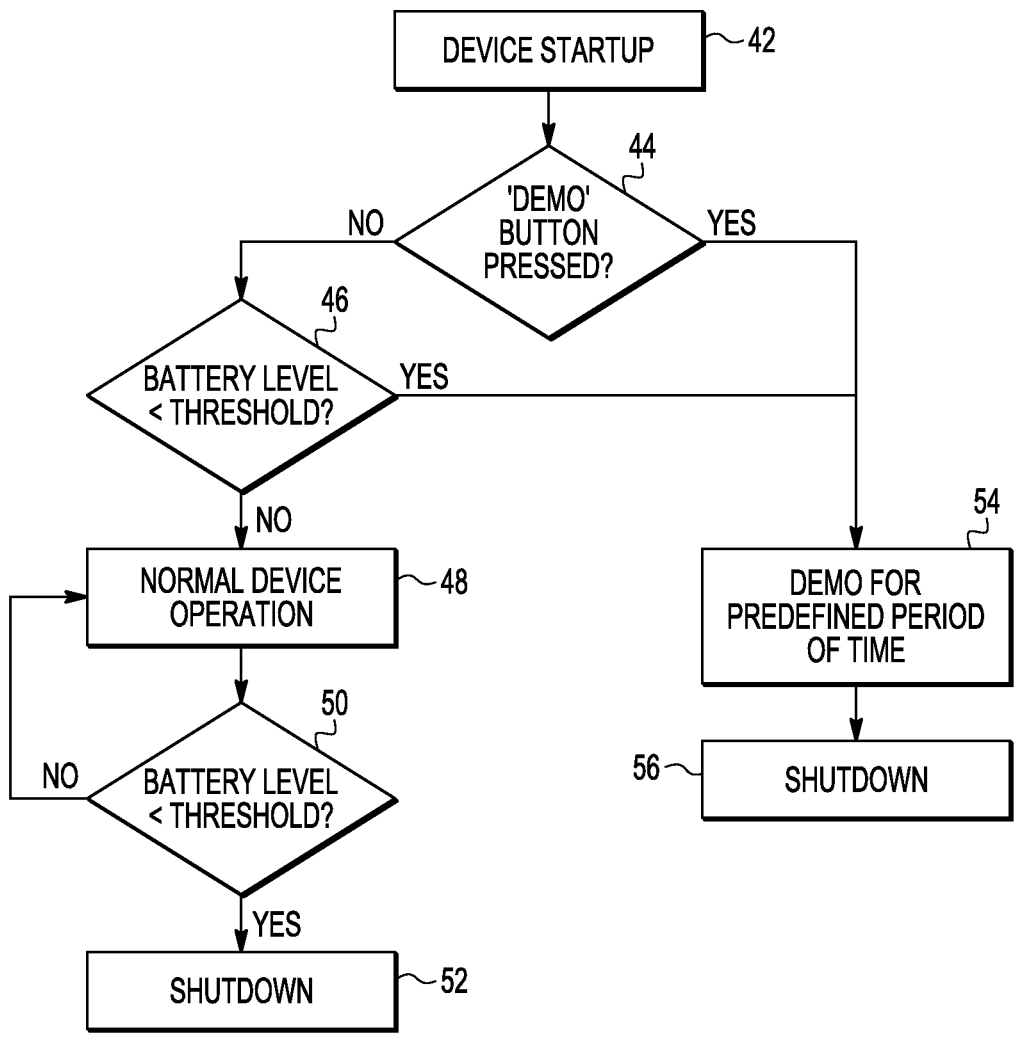
FIG. 3 illustrates, in flow diagram form, operation of an electronic device in accordance with one embodiment of the present invention.

FIG. 3 illustrates, in flow diagram form, a method 40 of operation of an electronic device, such as electronic device 10, in accordance with one embodiment of the present invention. In block 42, the electronic device is started up (i.e. powered up). At decision diamond 44, it is determined whether the "demo" button is pressed (or whether another predetermined activation sequence is performed indicating demonstration mode is to be entered). If the "demo" button is not pressed (i.e. if demonstration mode is not to be explicitly entered), then method 40 proceeds to decision diamond 46 in which it is determined (by, for example, the battery management module) whether the battery level (i.e. remaining battery capacity) is below the minimum battery threshold. If not, then method 40 proceeds to block 48 in which the electronic device enters the normal operating mode. During normal operation, the remaining battery capacity is continuously monitored, such as at decision diamond 50, and if the remaining battery capacity falls below the minimum battery threshold, method 40 proceeds to block 52 in which the electronic device is shut down. Since the minimum battery threshold ensures "n" demonstrations of "x" duration may still be performed with the current battery level, the electronic device is shut down during normal operation to ensure that sufficient battery capacity remains for demonstrations. In normal operation, if the remaining battery capacity remains above or equal to the minimum battery threshold, the device remains in normal operation, as illustrated in FIG. 3 by returning from decision diamond 50 back to block 48 when the batter level is not less than the threshold.

If demonstration mode is explicitly entered at decision diamond 44, method 40 proceeds to block 54. At block 54, the electronic device enters the demonstration mode in which the electronic device performs a demonstration for a predefined, i.e. predetermined, amount of time. This amount of time corresponds to the value "x" described above. After the predefined amount of time, the electronic device is shut down at block 56. In an alternate embodiment, the demonstration mode can be exited prior to the predefined amount of time through the use of an explicit key or key sequence.

Note that upon starting the device up again, if the battery has not been charged since the device was shut down either during normal operation (at block 52) or after a demonstration (at block 56), the user can either start by explicitly entering the demonstration mode (corresponding to the "yes" branch from decision diamond 44) or the battery management module will detect that the remaining battery capacity is still below the minimum battery threshold and cause the device to enter demonstration mode (corresponding to the "yes" branch from decision diamond 46). In one embodiment, upon entering demonstration mode, an indicator of demonstration mode stored within device 10 is set. Upon device startup, the device may check the stored indication to determine whether to start in demonstration mode. This indicator is then cleared upon the batter management module detecting that the battery level is above the minimum battery threshold.

In one embodiment, if upon powering up without explicitly entering the demonstration mode the battery level is determined to be below the minimum battery threshold, rather than automatically entering the demonstration mode (as with the "yes" branch from decision diamond 46 to block 54), the user can be notified of a low-power situation. At this point, the user can decide to either continue starting up in demonstration mode or shut down the device to conserve power. In yet another embodiment, if the battery level is below the minimum battery threshold and a user attempts to start the device in normal mode, the power up (i.e. startup) can be aborted and ignored all together and thus the electronic device would not be powered up at all (not in normal mode nor in demonstration mode). In this case, in which the power up of the device is ignored, the ignoring of the power up can be indicated by an indication not requiring a lot of power, such as a blinking LED.

In an alternate embodiment, as discussed above, upon starting up the electronic device, entry into the demonstration mode is automatically indicated. In this embodiment, the battery level is checked to determine whether it is below the minimum battery threshold. If so, the electronic device continues entering into demonstration mode, without a full boot up of the electronic device, in which a demonstration is performed for the predetermined amount of time. However, if the battery level is at or above the minimum battery threshold, entry into the demonstration mode is stopped and the electronic device proceeds with booting up into normal operating mode.

Note that, upon start up, regardless of whether the demonstration mode is explicitly entered, entered into automatically, or entered into in response to the battery level being less than the minimum battery threshold, a full boot up of the electronic device is not needed to enter the demonstration mode. This further helps to conserve battery power. Furthermore, any processing circuit or module within electronic device 10 may control the entering of demonstration mode and normal operating mode for electronic device 10 and may control the start up procedure and shut down of electronic device 10.

The discussions here have been made with respect to monitoring a charge, capacity, or level of a battery coupled to a battery node of the electronic device. However, in alternate embodiments, other types of charge storage cells, rather than batteries, may be monitored in the same manner described herein. Therefore, in FIGS. 1-3, the battery may be referred to more broadly as a charge storage cell, and the battery node may be more broadly referred to as a charge storage cell node or charge storage node. For example, in addition to a battery, the charge storage cell may be an internally charged source or a chargeable battery which can be charged by any type of charger, such as through solar-cells or energy harvesting. Therefore, note also that the battery level may be more broadly referred to as the charge level of the storage cell, and the minimum battery threshold may be more broadly referred to as a minimum charge threshold. Similarly, battery management unit 34 may be referred to as charge management unit, and module 32 may be characterized as calculating the require charge capacity.

Therefore, by now it can be appreciated how a demonstration mode of an electronic device can be used to ensure that a minimum battery level remains for performing a minimum number of demonstrations. The demonstrations are capable of showing that an electronic device is functional, such as at security terminals. In this manner, an electronic device can be prevented from being barred or confiscated by the security terminal for failing to demonstrate operability due to an empty battery or lack of energy in an internally charged source.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, although FIG. 1 is illustrated as a multiple processing system, an electronic device may include a single processor. Also, the electronic device of FIG. 1 may include different types of modules in place of or in addition to those illustrated. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

In one embodiment, in an electronic device having a plurality of modules coupled to a charge storage node, a method includes starting up the electronic device; entering a demonstration mode; during the demonstration mode, performing a demonstration for a predetermined amount of time by enabling a subset of modules of the plurality of modules; and at the expiration of the predetermined amount of time, shutting down the electronic device. In one aspect, entering demonstration mode is performed in response to a predetermined activation sequence of the electronic device. In a further aspect, the starting up the electronic device is performed in response to the predetermined activation sequence. In another aspect, entering the demonstration mode is performed in response to determining that a charge level of a charge storage cell coupled to the charge storage node is less than a minimum charge threshold. In a further aspect, the method further includes determining the minimum charge threshold based on a number of demonstrations to be performed on a remaining capacity of the charge storage cell. In yet a further aspect, the method further includes, prior to determining the minimum charge threshold based on the number of demonstrations, storing the number of demonstrations within storage circuitry of the electronic device. In another aspect, entering demonstration mode is performed upon starting up the electronic device when the charge level of the charge storage cell is less than the minimum charge threshold. In another aspect of the above embodiment, after shutting down the electronic device, the method further includes starting up the electronic device in normal mode; if the charge level of the charge storage cell is less than the minimum charge threshold, aborting the startup; and providing an indicator of the aborted startup.

9. In another embodiment, in an electronic device having a plurality of modules coupled to a charge storage node, a method includes starting up the electronic device; completing boot up of the electronic device to operate the electronic device in normal operating mode; during operation in normal operating mode: monitoring a charge level of a charge storage cell coupled to the charge storage node, and when the charge level falls below a minimum charge threshold, shutting down the electronic device, wherein the minimum charge threshold is based on a number of demonstrations to be performed on a remaining capacity of the charge storage cell. In one aspect of the above another embodiment, after shutting down the electronic device, the method further includes starting up the electronic device; entering a demonstration mode; during the demonstration mode, performing a demonstration for a predetermined amount of time by enabling a subset of modules of the plurality of modules; and at the expiration of the predetermined amount of time, shutting down the electronic device. In a further aspect, entering demonstration mode is performed in response to a predetermined activation sequence of the electronic device. In another further aspect, entering demonstration mode is performed in response to determining that the charge level of the charge storage cell is less than the minimum charge threshold. In yet another further aspect, entering demonstration mode is performed automatically upon starting up the electronic device.

In yet another embodiment, an electronic device having a normal operating mode and a demonstration mode includes a processing circuit; a power manager coupled to a charge storage node and having a charge management unit configured to monitor a charge level of a charge storage cell coupled to the charge storage node and to indicate to the processing circuit when the charge level falls below a minimum charge threshold; and a plurality of modules coupled to the processing circuit, wherein the power manager is configured to, in response to the processing circuit entering the demonstration mode, enable a subset of the plurality of modules to perform a demonstration of a functionality of the electronic device for a predetermined amount of time, and wherein the processor is configured to shut down the electronic device in response to expiration of the predetermined amount of time. In one aspect, the processing circuit is configured to operate in demonstration mode upon start up in response to a predetermined key sequence or in response to the charge management unit indicating that the charge level is less than the minimum charge threshold. In another aspect, the power manager is configured to store a value indicating a number of demonstrations to be performed on a remaining capacity of the charge storage cell. In a further aspect, the power manager is configured to calculate the minimum charge threshold based on the value indicating the number of demonstrations. In another further aspect, the power manager is configured to store a second value indicating the predetermined amount of time, and wherein the power manager is configured to calculate the minimum charge threshold based on the value indicating the number of demonstrations and the second value indicating the predetermined amount of time. In another aspect, the electronic device further includes a clock manager coupled to the plurality of modules and the processing circuit, wherein the power manger is configured to provide a power signal to the subset of the plurality of modules to perform the demonstration, and the clock manager is configured to provide a clock signal to one or more selected modules of the subset of the plurality of modules to perform the demonstration. In yet another aspect, the power manager is configured to monitor the charge level of the charge storage cell during normal operation of the electronic device, and wherein the processor is configured to, during normal operation of the electronic device, shut down the electronic device in response to the power manager indicating that the charge level has fallen below the minimum charge threshold.

What is claimed is:

1. In an electronic device having a plurality of modules coupled to a charge storage node, a method comprising:
   determining whether a predetermined activation sequence of the electronic device is performed during a start up of the electronic device;
   if the predetermined activation sequence of the electronic device is not performed, entering the electronic device into a normal mode after the start up of the electronic device;
   otherwise, if the predetermined activation sequence of the electronic device is performed, entering a demonstration mode after the start up of the electronic device;
      during the demonstration mode, performing a demonstration for a predetermined amount of time by enabling a subset of modules of the plurality of modules;
      if an explicit key is pressed prior to the expiration of the predetermined amount of time, exiting the demonstration mode and shutting down the electronic device; and
      otherwise, at the expiration of the predetermined amount of time, exiting the demonstration mode and shutting down the electronic device;
   wherein after shutting down the electronic device, the method further comprises:
      starting up the electronic device in normal mode;
      if the charge level of the charge storage cell is less than the minimum charge threshold, aborting the startup; and
      providing an indicator of the aborted startup.

2. The method of claim 1, wherein the starting up the electronic device is performed in response to the predetermined activation sequence.

3. The method of claim 1, wherein entering the demonstration mode is performed in response to determining that a charge level of a charge storage cell coupled to the charge storage node is less than a minimum charge threshold.

4. The method of claim 3, further comprising:
   determining the minimum charge threshold based on a number of demonstrations to be performed on a remaining capacity of the charge storage cell.

5. The method of claim 4, further comprising:
   prior to determining the minimum charge threshold based on the number of demonstrations, storing the number of demonstrations within storage circuitry of the electronic device.

6. The method of claim 3, wherein entering demonstration mode is performed upon starting up the electronic device when the charge level of the charge storage cell is less than the minimum charge threshold.

7. In an electronic device having a plurality of modules coupled to a charge storage node, a method comprising:
determining whether a predetermined activation sequence of the electronic device is performed during a start up of the electronic device;
if the predetermined activation sequence of the electronic device is performed, completing boot up of the electronic device to operate the electronic device a demonstration mode after the start up of the electronic device;
otherwise, if the predetermined activation sequence of the electronic device is not performed, completing boot up of the electronic device to operate the electronic device in a normal operating mode after the start up of the electronic device;
during operation in the demonstration mode:
if an explicit key is pressed prior to the expiration of the predetermined amount of time, exiting the demonstration mode and shutting down the electronic device; and
otherwise, at the expiration of the predetermined amount of time, exiting the demonstration mode and shutting down the electronic device; and
during operation in the normal operating mode:
monitoring a charge level of a charge storage cell coupled to the charge storage node, and
when the charge level falls below a minimum charge threshold, shutting down the electronic device, wherein the minimum charge threshold is based on a number of demonstrations to be performed on a remaining capacity of the charge storage cell;
wherein after shutting down the electronic device, the method further comprises:
starting up the electronic device in normal mode;
if the charge level of the charge storage cell is less than the minimum charge threshold, aborting the startup; and
providing an indicator of the aborted startup.

8. The method of claim 7, wherein after shutting down the electronic device, the method further comprises:
starting up the electronic device;
entering the demonstration mode in response to the predetermined activation sequence of the electronic device being performed;
during the demonstration mode, performing a demonstration for a predetermined amount of time by enabling a subset of modules of the plurality of modules; and
at the expiration of the predetermined amount of time, shutting down the electronic device.

9. The method of claim 8, wherein entering demonstration mode is further performed in response to determining that the charge level of the charge storage cell is less than the minimum charge threshold.

10. The method of claim 8, wherein entering demonstration mode is performed automatically upon starting up the electronic device.

11. An electronic device having a normal operating mode and a demonstration mode, the electronic device comprising:
a processing circuit;
a power manager coupled to a charge storage node and having a charge management unit configured to monitor a charge level of a charge storage cell coupled to the charge storage node and indicate to the processing circuit when the charge level falls below a minimum charge threshold; and
a plurality of modules coupled to the processing circuit, wherein the power manager is configured to, in response to the processing circuit entering the demonstration mode, enable a subset of the plurality of modules to perform a demonstration of a functionality of the electronic device for a predetermined amount of time, and wherein the processing circuit is configured to determine whether a desired functionality has been demonstrated, configured to shut down the electronic device in response to the desired functionality being demonstrated, otherwise configured to determine whether the predetermined amount of time as passed since the demonstration mode was entered, to exit the demonstration mode and shut down the electronic device prior to the predefined amount of time in response to a detection of explicit key being pressed, and configured to exit the demonstration mode and to shut down the electronic device in response to expiration of the predetermined amount of time since the demonstration mode was entered, wherein after shutting down the electronic device, the method further comprises: starting up the electronic device in normal mode; if the charge level of the charge storage cell is less than the minimum charge threshold, aborting the startup; and providing an indicator of the aborted startup.

12. The electronic device of claim 11, wherein the processing circuit is configured to operate in demonstration mode upon start up in response to a predetermined key sequence or in response to the charge management unit indicating that the charge level is less than the minimum charge threshold.

13. The electronic device of claim 11, wherein the power manager is configured to store a value indicating a number of demonstrations to be performed on a remaining capacity of the charge storage cell.

14. The electronic device of claim 13, wherein the power manager is configured to calculate the minimum charge threshold based on the value indicating the number of demonstrations.

15. The electronic device of claim 13, wherein the power manager is configured to store a second value indicating the predetermined amount of time, and wherein the power manager is configured to calculate the minimum charge threshold based on the value indicating the number of demonstrations and the second value indicating the predetermined amount of time.

16. The electronic device of claim 11, further comprising a clock manager coupled to the plurality of modules and the processing circuit, wherein the power manger is configured to provide a power signal to the subset of the plurality of modules to perform the demonstration, and the clock manager is configured to provide a clock signal to one or more selected modules of the subset of the plurality of modules to perform the demonstration.

17. The electronic device of claim 11, wherein the power manager is configured to monitor the charge level of the charge storage cell during normal operation of the electronic device, and wherein the processor is configured to, during normal operation of the electronic device, shut down the electronic device in response to the power manager indicating that the charge level has fallen below the minimum charge threshold.

* * * * *